United States Patent
Alonso et al.

(10) Patent No.: US 9,823,502 B2
(45) Date of Patent: Nov. 21, 2017

(54) METHOD AND APPARATUS FOR COLOR FILTER AS TOUCH PAD

(71) Applicant: Nokia Corporation, Espoo (FI)

(72) Inventors: Vicente Calvo Alonso, Piispanristi (FI); Juha H-P Nurmi, Salo (FI)

(73) Assignee: Nokia Technologies Oy, Espoo (FI)

( * ) Notice: Subject to any disclaimer, the term of this patent is extended or adjusted under 35 U.S.C. 154(b) by 135 days.

(21) Appl. No.: 13/916,050

(22) Filed: Jun. 12, 2013

(65) Prior Publication Data

US 2014/0368749 A1    Dec. 18, 2014

(51) Int. Cl.
G09G 5/00    (2006.01)
G02F 1/1333    (2006.01)
G02F 1/1335    (2006.01)

(52) U.S. Cl.
CPC .... *G02F 1/13338* (2013.01); *G02F 1/133514* (2013.01); *G02F 2001/133334* (2013.01)

(58) Field of Classification Search
CPC .......... G02F 1/13338; G02F 1/133509; G02F 1/133514; G02F 2001/133334; G06F 3/041
USPC .................... 345/156–184; 718/18.01–18.09, 718/19.01–19.04, 20.01
See application file for complete search history.

(56) References Cited

U.S. PATENT DOCUMENTS

| | | | |
|---|---|---|---|
| 6,972,819 B2 | 12/2005 | Lee et al. | 349/149 |
| 2009/0109202 A1* | 4/2009 | Kitagawa | 345/206 |
| 2011/0242444 A1* | 10/2011 | Song | 349/43 |
| 2012/0206395 A1* | 8/2012 | Misaki | G06F 3/044 345/173 |
| 2012/0249912 A1 | 10/2012 | Huang et al. | 349/42 |
| 2013/0033452 A1* | 2/2013 | Fukushima et al. | 345/174 |
| 2013/0076996 A1* | 3/2013 | Misaki | G06F 3/0418 349/12 |
| 2013/0135569 A1* | 5/2013 | Nagami | G02F 1/133514 349/106 |

OTHER PUBLICATIONS

IPS panel. (Jun. 11, 2013), In *Wikipedia, the Free Encyclopedia*, Retrieved 15:09, Jun. 11, 2013, from http://en.wikipedia.org/w/index.php?title=IPS_panel&oldid=559359295, 4 pages.

Indium tin oxide. (Jun. 5, 2013), In *Wikipedia, the Free Encyclopedia*, Retrieved 15:13, Jun. 11, 2013, from http://en.wikipedia.org/w/index.php?title=Indium_tin_oxide&oldid=558468936, 4 pages.

* cited by examiner

*Primary Examiner* — Insa Sadio
(74) *Attorney, Agent, or Firm* — Harrington & Smith

(57) ABSTRACT

In accordance with an example embodiment of the present invention, an apparatus is disclosed. The apparatus includes a display section and a touch panel section. The touch panel section is adjacent the display section. The touch panel section includes a first layer, a second layer and a third layer. The first layer includes a conductive material. The second layer includes a bottom guard layer. The third layer includes a top guard layer. The first layer is between the second and third layers. The conductive material includes a color filter and a black matrix.

15 Claims, 10 Drawing Sheets

METHOD AND APPARATUS FOR COLOR FILTER AS TOUCH PAD

TECHNICAL FIELD

The invention to an electronic device and, more particularly, to including color filters and black matrix in a display of an electronic device.

BACKGROUND

An electronic device typically comprises a variety of user interface components that enable users to interact with the electronic device. User interface components in portable electronic devices need to fulfill several requirements, such as compactness, suitability for mass manufacturing, durability, and ease of use. Increase of computing power of portable devices is turning them into versatile portable computers, which can be used for multiple different purposes. Therefore versatile user interface components are needed in order to take full advantage of capabilities of mobile devices.

Many conventional devices include 'so called' 2D touch capacitive touch screens which are generally able to detect a location of one or more simultaneous touches in x-y coordinates. One area gaining popularity in the consumer market is the use of 'so called' improved 2D touch screens or 3D touch screens, which are capable of detecting z-direction touches.

Accordingly, consumers demand increased functionality from the electronic device, there is a need to provide an improved device having increased capabilities, such as a three-dimensional touch display, while maintaining robust and reliable product configurations.

SUMMARY

Various aspects examples of the invention are set out in the claims.

In accordance with one aspect of the invention, an apparatus is disclosed. The apparatus includes display section and a touch panel section. The touch panel section is adjacent the display section. The touch panel section includes a first layer, a second layer and a third layer. The first layer includes a conductive material. The second layer includes a bottom guard layer. The third layer includes a top guard layer. The first layer is between the second and third layers. The conductive material includes a color filter and a black matrix.

In accordance with another aspect of the invention, a method is disclosed. A black matrix is formed on a substrate. A surface of the substrate is coated with a color resist film. The color resist film is exposed. A pattern of the color resist film is cured. A transparent conductive film is formed over the pattern of the color resist film.

In accordance with another aspect the invention, an apparatus is disclosed. The apparatus includes a color filter and a black matrix. The color filter and the black matrix form a conductive layer. The conductive layer is configured to form a touch pattern layer, a traces layer, or a shielding layer.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 12 of the drawings.

Figure 1:
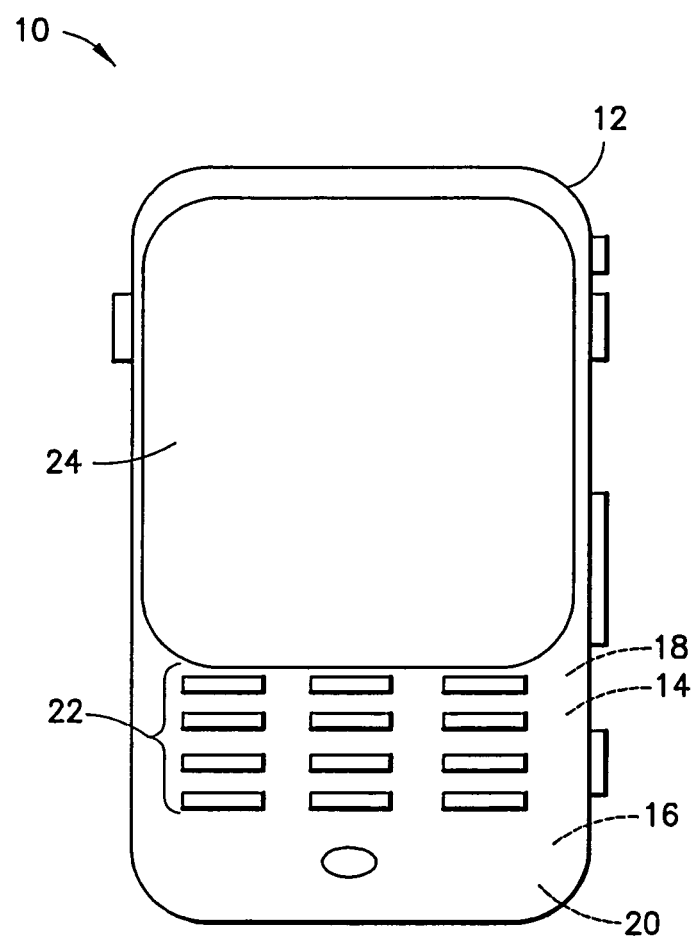
FIG. 1 is a front view of an electronic device incorporating features of the invention.

Referring to FIG. 1, there is shown a front view of an electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

According to one example of the invention, the device 10 is a multi-function portable electronic device. However, in alternate embodiments, features of the various embodiments of the invention could be used in any suitable type of portable electronic device such as a mobile phone, a gaming device, a music player, a notebook computer, or a personal digital assistant, for example. In addition, as is known in the art, the device 10 can include multiple features or applications such as a camera, a music player, a game player, or an Internet browser, for example. The device 10 generally comprises a housing 12, a transmitter 14, a receiver 16, an antenna 18 (connected to the transmitter 14 and the receiver 16), electronic circuitry 20, such as a controller (which could include a processor, for example) and a memory for example, within the housing 12, a user input region 22 and a display 24. The display 24 could also form a user input section, such as a touch screen.

Figure 2:
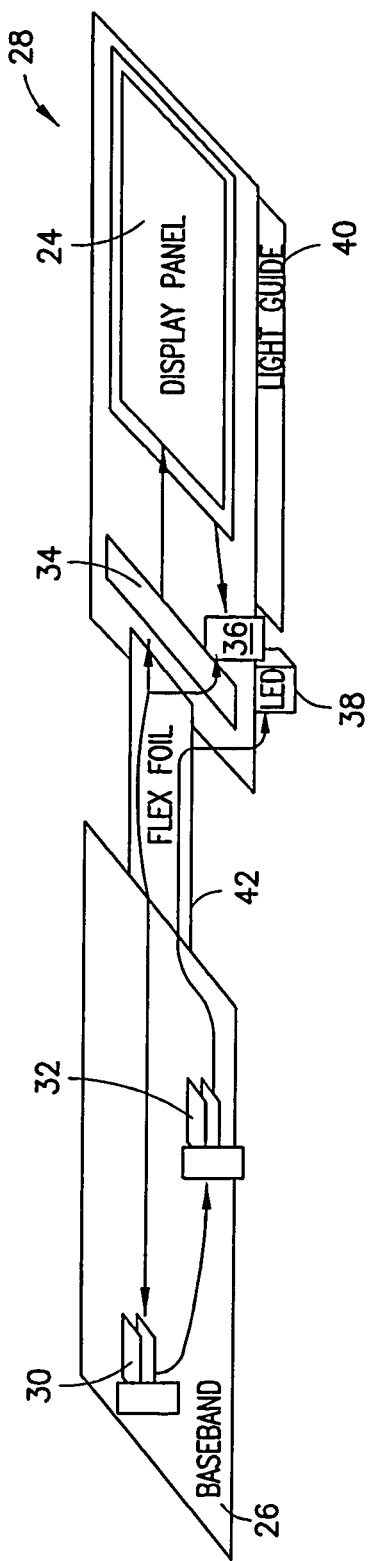
FIG. 2 is a perspective view illustrating components of the device shown in FIG. 1.
Figure 3:
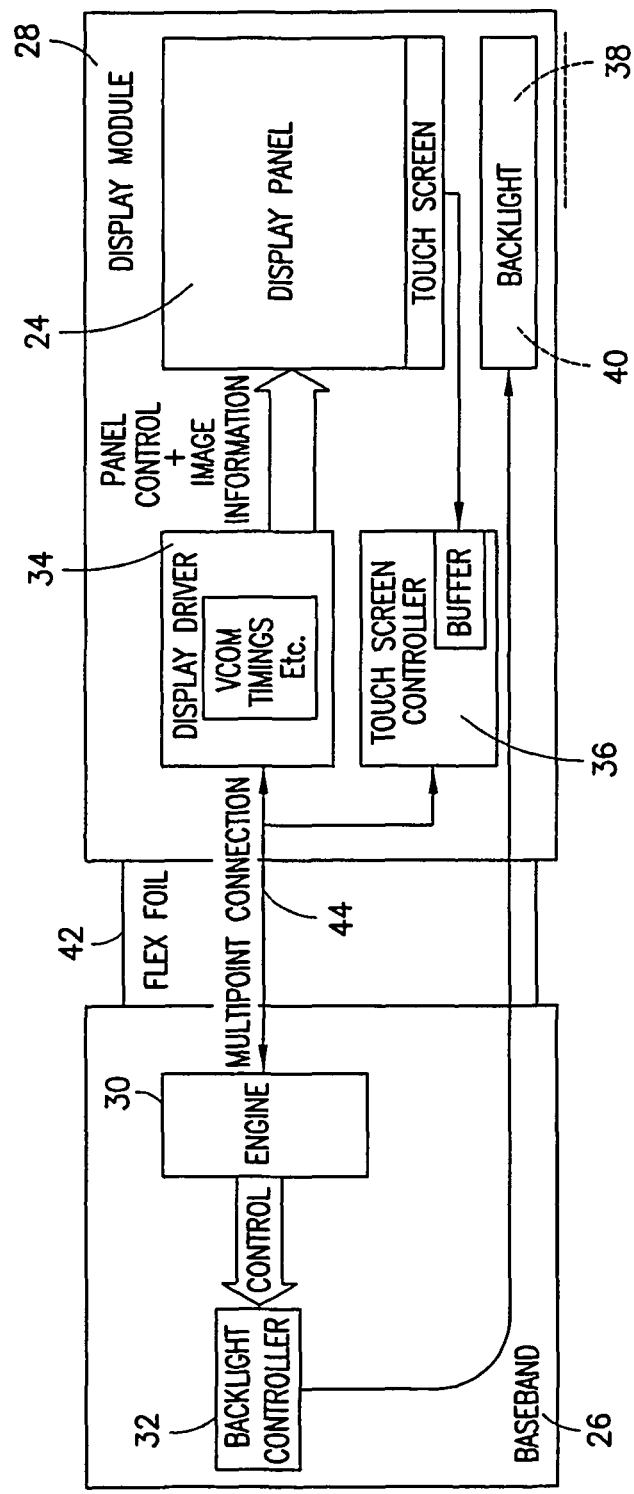
FIG. 3 is top view illustrating components of the device shown in FIG. 1.

Referring now also to FIGS. 2 and 3, wherein FIG. 2 is a perspective view illustrating components of the device 10, and FIG. 3 is a schematic drawing of the illustrated device components. In particular, there is shown a base band 26 and a display module 28. The base band 26 generally includes an engine 30, and a backlight controller 32. The engine 30 generally controls various conversions of the device 10, such as converting electrical information to a readable format on the display 24, or converting audio from acoustic waves to an electrical format, for example. The engine 30 can include a controller (which could include a processor, for example). In various exemplary embodiments of the invention the engine 30 also controls the backlight controller 32. Additionally, according to some embodiments of the invention, more than one engine could be provided.

The display module 28 generally includes the display panel 24 (which as mentioned above, could include a touch screen), display driver 34, touch screen controller 36, a light emitting diode (LED) arrangement 38, and a light guide 40. The display driver 34 may, for example, generate VCOM, timings, and send panel control and image information to the display panel 24. According to various exemplary embodiments the engine 30 generally controls the image of the display panel 24 and can also read touch screen values via the touch screen controller 36. The engine 30 can also control the backlight controller 32 to control the backlight (such as controlling the light emitting diode arrangement 38). However, any suitable configuration may be provided.

According to some embodiments of the invention, a flex foil (or flexible printed circuit) 42 may be connected between the base band 26 and the display module 28. In this embodiment, a multipoint connection 44 is provided between the engine 30, the display driver 34, and touch screen controller 36. However, in alternate embodiments, any suitable type, or number, of connections may be provided. It should further be noted that the components described above are provided as non-limiting examples and any suitable configurations for the base band and the display module can be provided.

Figure 4:
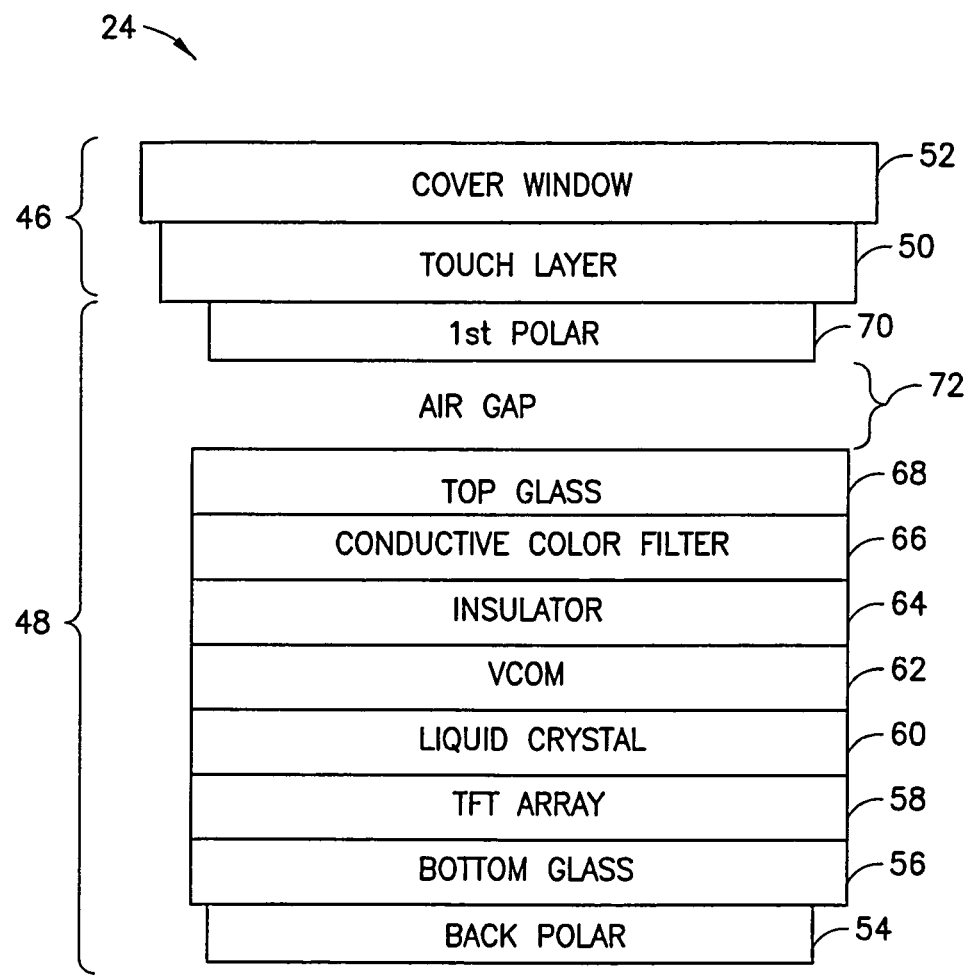
FIG. 4 is a partial section representation of a display of the device shown in FIG. 1.

Referring now also to FIG. 4, according to various exemplary embodiments of the invention the display 24 comprises a window integrated/laminated touch section 46 and a display panel section 48. The window integrated/laminated touch section 46 comprises a touch layer 50 and a cover window 52. The display panel section 48 comprises back polar (or polarizer) layer 54, a bottom glass layer 56, a thin-film transistor (TFT) layer 58, liquid crystal layer 60, a common voltage (VCOM) layer 62, an insulator layer 64, a conductive color filter layer 66, a top glass layer 68, and a first polar layer 70, wherein an air gap 72 may be provided between the first polar (or polarizer) layer 70 and the top glass layer 68. However, in alternate embodiments, any suitable size, shape or other type of elements or materials could be provided.

It should be noted that according to various exemplary embodiments of the invention, the display 24 may include a 3D touch screen implementation having a stacked display, including a touch sensor and cover window on top of the display section. Additionally, the display may include an LCD or OLED type of display, or any other suitable type display. Furthermore, in some embodiments, any suitable type stack, such as those using plastic substrates, may be provided. It should also be noted that various exemplary embodiments provide for the touch panel (or touch panel section, or touch sensor) to include three main functional parts, such as an excitation electrode, sensing electrodes, and a guarding electrode. However, any suitable type, number, or configuration of electrodes may be provided.

According to various embodiments, the conductive color filter layer may provide a shield layer for the display. For example, conductive color filters (+ black matrix) are used as a shield layer in the embodiment shown in FIG. 4. This provides for a shield layer between a portion of the display panel section and the touch panel (noise barrier).

Figure 5:
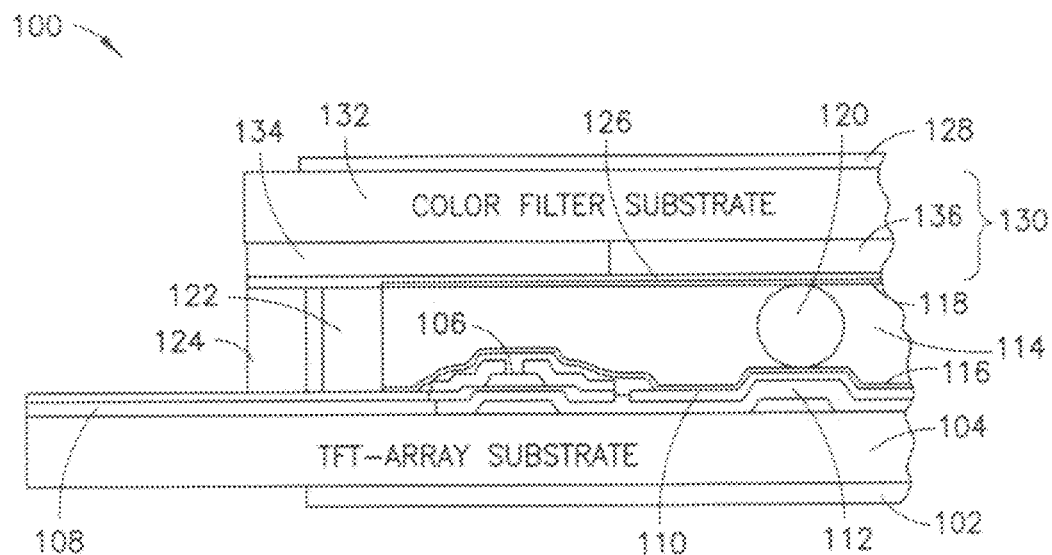
FIG. 5 is a partial section view of a display incorporating features of the invention.
Figure 6:
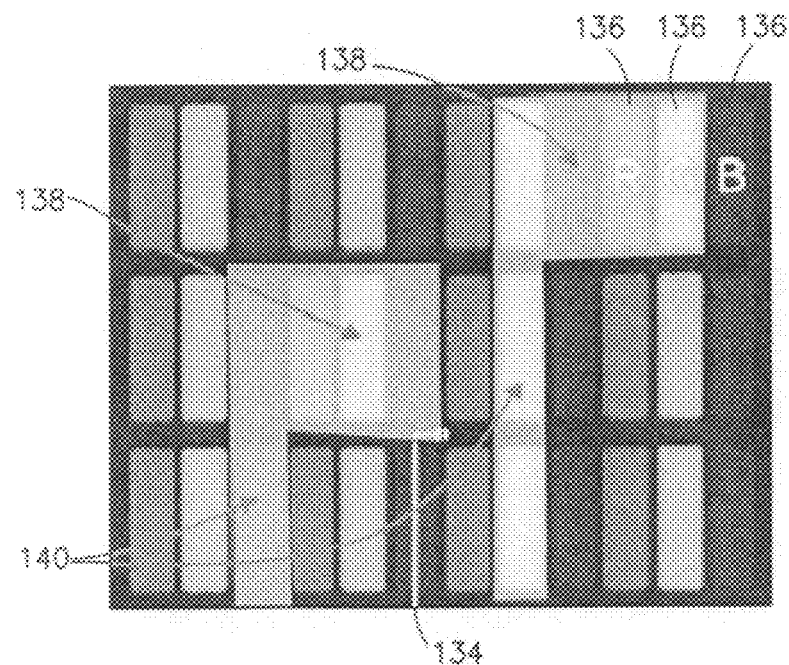
FIG. 6 is a top view of a color filter of the display shown in FIG. 5.

Referring now also to FIG. 5, there is shown a partial section view of a display 100 according to various exemplary embodiments of the invention. The display 100 comprises a polarizer layer 102, a thin-film transistor (TFT) array substrate layer 104, a thin-film transistor (TFT) 106, a bonding pad layer 108, a pixel electrode 110 (wherein the films or sheets can be coated with indium tin oxide (ITO)), and a storage capacitor 112. The display 100 further comprises a liquid crystal layer 114 between alignment layers 116, 118 having a spacer 120 and adjacently disposed seal 122 and short 124. A VCOM (or common electrode [ITO]) layer 126 is provided as a bottom guard layer (3D touch) for the display. A top polarizer layer 128 is provided as a top guard layer (3D touch) for the display. Between the top guard layer 128 and the bottom guard layer 126 there is provided a color filter layer 130. The color filter layer 130 comprises a color filter substrate 132, black matrix (or black matrix material) 134, and color filters 136 (which can be red, green, and blue color filters, for example). Referring now also to FIG. 6, there is shown a top plan view of the color filter further detailing 3D touch pads portions 138 and trace 140 for 3D touch pad portions. However, in alternate embodiments, any suitable size, shape or other type of elements or materials could be provided.

It should be noted that references made to "3D touch" generally refer to touch screen displays which are capable to detect z-direction touches (in addition to touches in x-y coordinates [corresponding to the plane of the display]) from a distance of an object from the touch screen enabling new basic features like finger nail usage, glove usage, and stylus support, for example. Additionally, 3D (three dimensional) touch may also be referred to as 3D hovering touches or 3D proximity touch. Furthermore, 3D touch may refer to any suitable touch screen display configured to accurately detect hovering from a very long distance, and supports several simultaneous hovering touches and is even capable to detect inclination angle of an object or finger, for example.

In some embodiments a 3D touch sensing functionality is implemented on and under a top substrate of the display when additional visible patterns as well as layers are not needed. For example, as shown in FIGS. 5 and 6, the top polarizer 128 is a conductive material when it can be used as a top guard layer (touch sensor pad areas generally cannot be shielded and thus no conductive material). According to some embodiments of the invention, the color filters and black matrix of the pixels are a conductive material or insulating material. For the conductive material various embodiments provide for creating touch pads (group of subpixels=>Area) and creating traces for touch pads (group of subpixels=>Line). For the insulation material, various embodiments provide for creating insulating areas between conductive areas (group of the pixels=>Area).

Figure 7:
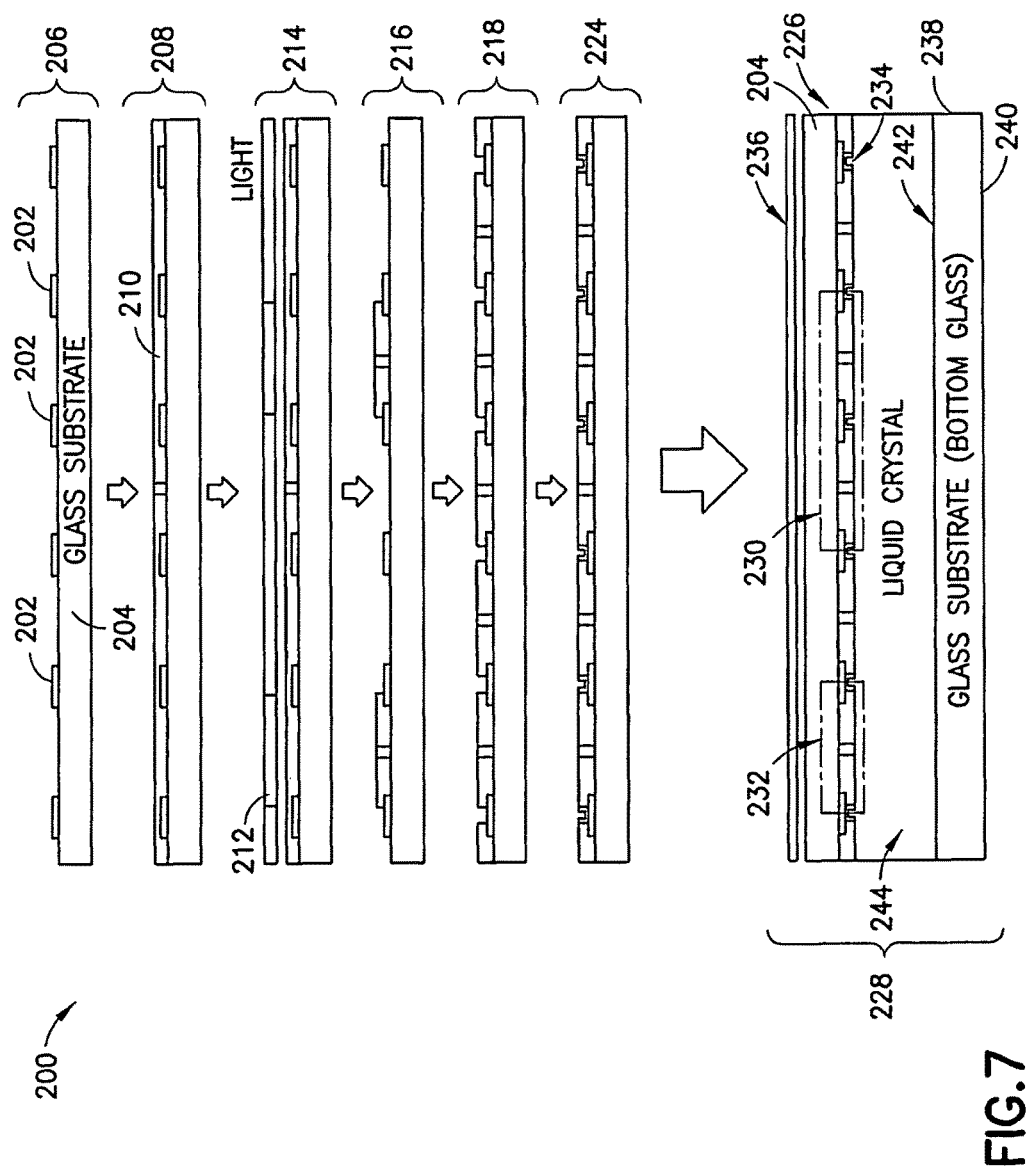
FIG. 7 is a representative diagram of a color filter process incorporating features of the invention.

Referring now also to FIG. 7, there is shown a representative diagram (and a block diagram in FIG. 8) of a color filter manufacturing process 200 by a photolithographic method in accordance with various exemplary embodiments of the invention. In this process, touch pads and their traces are implemented with conductive color filter and black matrix materials (insulation is done by non-conductive color filter and black matrix materials) during manufacturing process.

A black matrix 202 is formed first on a glass substrate 204 in order to prevent any leakage of backlight and the RGB color mixture (see 206 [Black matrix formation]). This generally provides for black matrix formation (which may be low reflectance chrome or resin, for example) including conductive and non-conductive black matrix. A color resist is then coated on substantially the entire glass substrate surface (see 208 [Color resist coating]). This forms a color resist coating/film 210 on the glass substrate surface. To make the pattern insoluble, it is UV cured by exposure through a photomask 212 (see 214 [Exposure]). After the removal of unnecessary portions of the color resist by the developing solution, the pattern is cured through baking (see 216 [Development and baking]). The above processes of 208, 214, and 216 are repeated three times, once each for Red/Green/Blue [RGB] (see 218). The above processes of 208, 214, and 216 are repeated now two times, once for conductive color filters and once for non-conductive color filters (see 220 in FIG. 8). Next an insulator layer is added (see 222 in FIG. 8), followed by ITO Layer. The ITO film (transparent conductive film) may be formed by the spattering method (see 224 [ITO film formation]).

The above process 200 provides a touch screen 226 for an integrated display and touch panel 228. As shown in FIG. 7, the touch screen (or touch panel) 226 comprises 3D touch pad(s) 230, traces 232 for the 3D touch pad(s), and the ITO film 234 forms the 3D touch bottom guard. A conductive top polarizer (for example the touch sensor pad areas that cannot be shielded) on an opposite side of the glass substrate 204 therefore forms the 3D touch top guard 236. The integrated display and touch panel 228 further comprises a glass substrate (bottom glass) 238 with a bottom polarizer layer 240 on one side and a TFT layer 242 on the other side, and a liquid crystal layer 244 between the TFT layer 242 and the touch screen 226.

Figure 9:
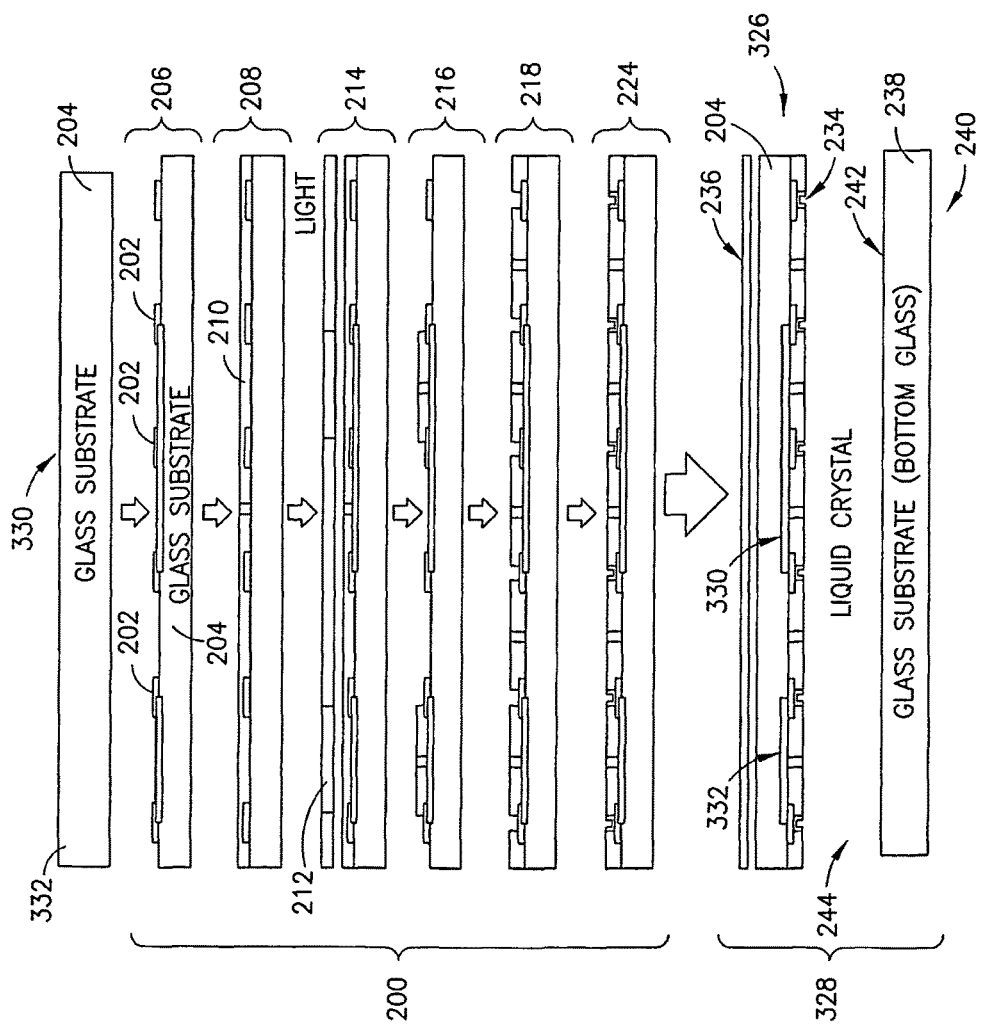
FIG. 9 is a representative diagram of a color filter process incorporating features of the invention.
Figure 10:
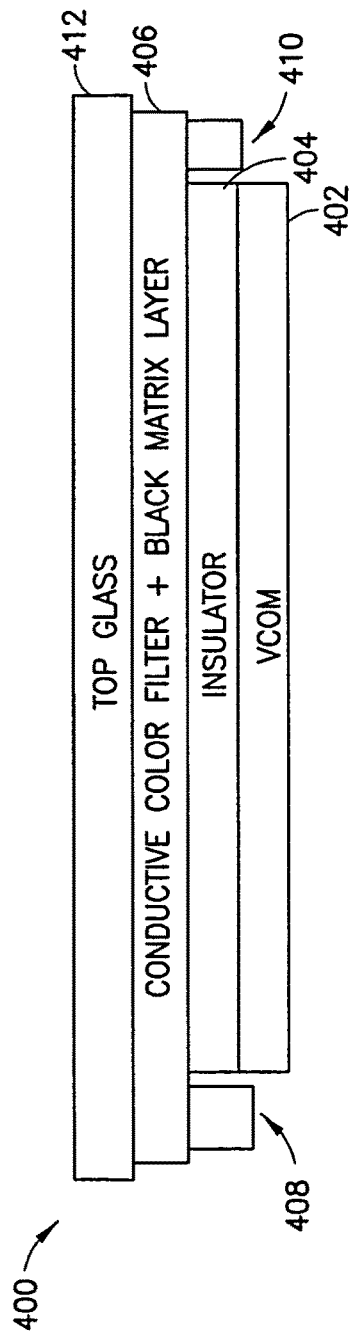
FIG. 10 is a partial side section view of a display panel section incorporating features of the invention.

Referring also to FIG. 9, in some embodiments the touch pads 330 and their traces 332 (ITO) are implemented on the glass substrate 204 before the color filter manufacturing process (color filters and black matrix is a insulator layer). In these embodiments, the touch pads are not crossing in the middle of the visible pixels, because the whole color filter is a part of the touch pad or the insulating area.

Figure 8:
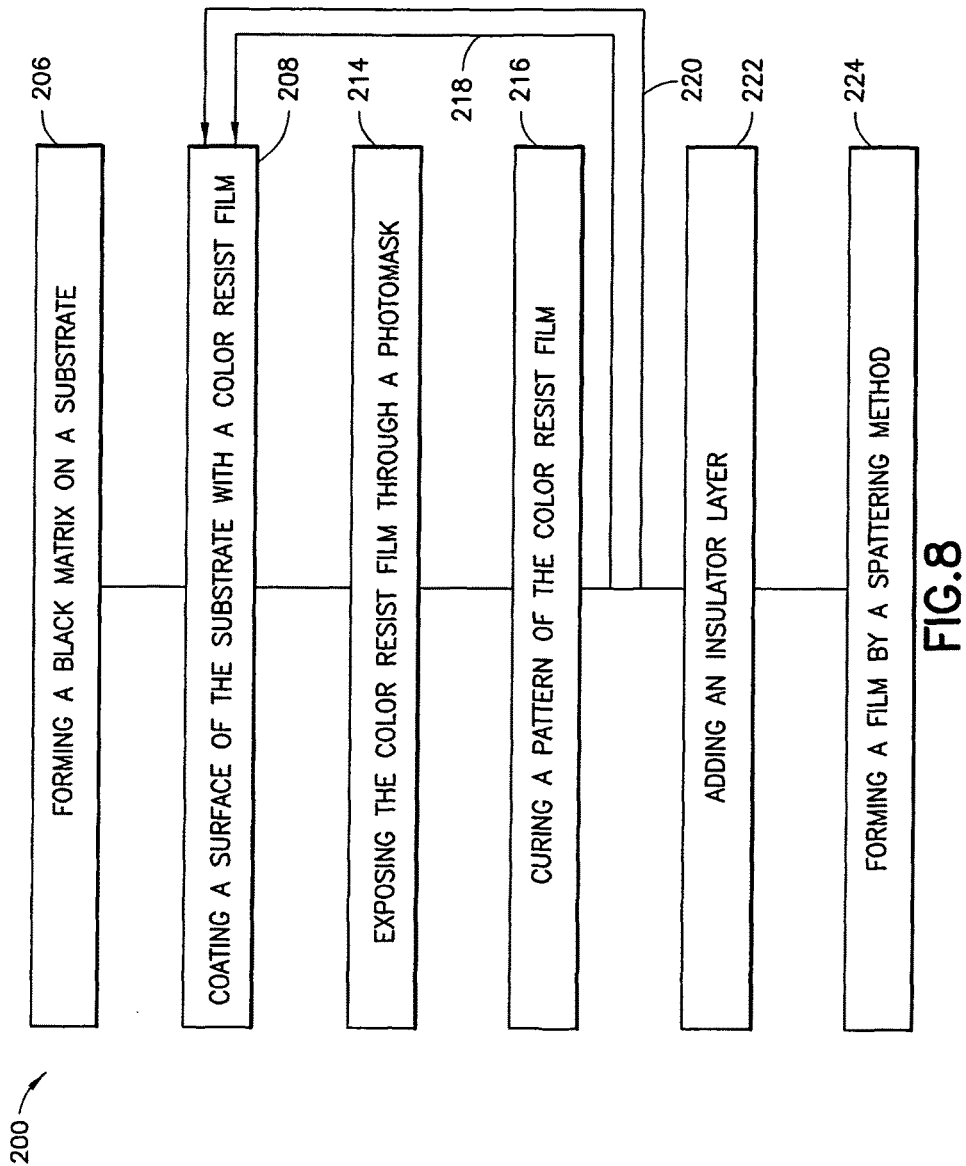
FIG. 8 is a block diagram of the color filter process shown in FIG. 7.

Similar to FIGS. 7, 8, the color filter manufacturing process 200 is performed after the touch pads 330 and their traces 332 (ITO) are implemented on the glass substrate 204. Also similar to above, the process 200 provides a touch screen 326 for an integrated display and touch panel 328. As shown in FIG. 9, the touch screen (or touch panel) 326 comprises the 3D touch pad(s) 330, the traces 332 for the 3D touch pads, and the ITO film 234 forms the 3D touch bottom guard. The conductive top polarizer (for example the touch sensor pad areas that cannot be shielded) on an opposite side of the glass substrate 204 therefore forms the 3D touch top guard 236. The integrated display and touch panel 328 further comprises the glass substrate (bottom glass) 238 with the bottom polarizer layer 240 on one side and the TFT layer 242 on the other side, and the liquid crystal layer 244 between the TFT layer 242 and the touch screen 396.

According to some embodiments, subpixels that are used for 3D touch pads and traces and that are not used for 3D touch pads and traces are generally known by the hardware because their locations are known. Additionally, a subpixel driving system can used for fine tuning values for each subpixel (such as when color uniformity is not the same, for example) and subpixels for 3D touch pads or traces versus subpixels without 3D touch pads and traces.

Figure 11:
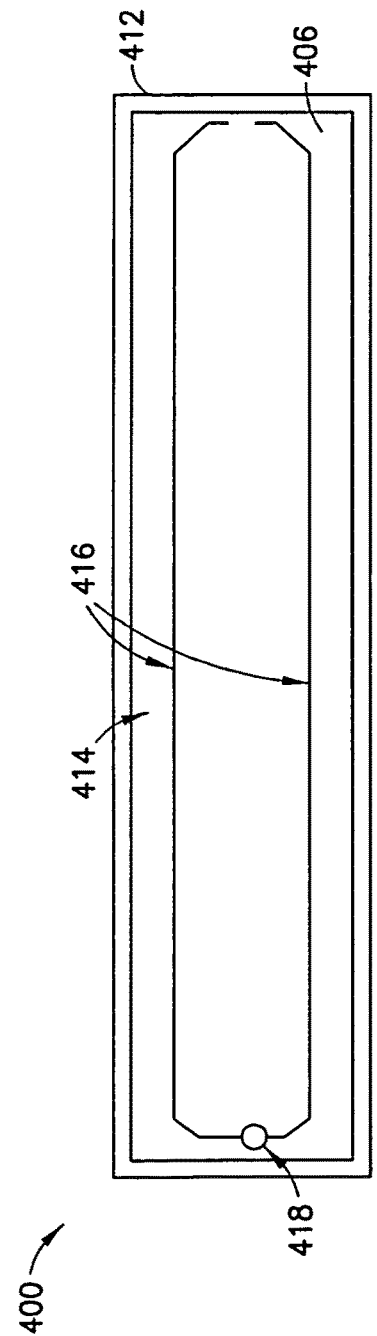
FIG. 11 is a top view of the display panel section shown in FIG. 10.

According to some other embodiments of the invention (and referring now also to FIGS. 10 and 11), conductive color filters and black matrix can be used for traces when components, that are placed in different locations on the top glass, can be connected together and especially components that are assembled under the top glass. For example, in FIG. 10, there is shown a side view of a display panel section 400. The display panel section 400 comprises a common voltage (VCOM) layer 402, an insulator layer 404, a conductive color filter and black matrix layer 406, an ambient light sensor (ALS) 408 connected to the conductive color filter and black matrix layer 406, driver integrated circuit (IC) 410 connected to the conductive color filter and black matrix layer 406, and a top glass layer 412. Additionally, in FIG. 11, there is shown a bottom view of the display panel section 400. FIG. 11 further illustrates the insulator (color filters black matrix) at 414, the traces (conductive color filters and black matrix) 416, and an aperture 418 for the ALS 408. However, in alternate embodiments, any suitable size, shape or other type of elements or materials could be provided. It should also be noted that, the bottom view of the display panel section 400 is shown in FIG. 11 without the ALS 408 and the driver IC 410 for the purposes of clarity.

Figure 12:
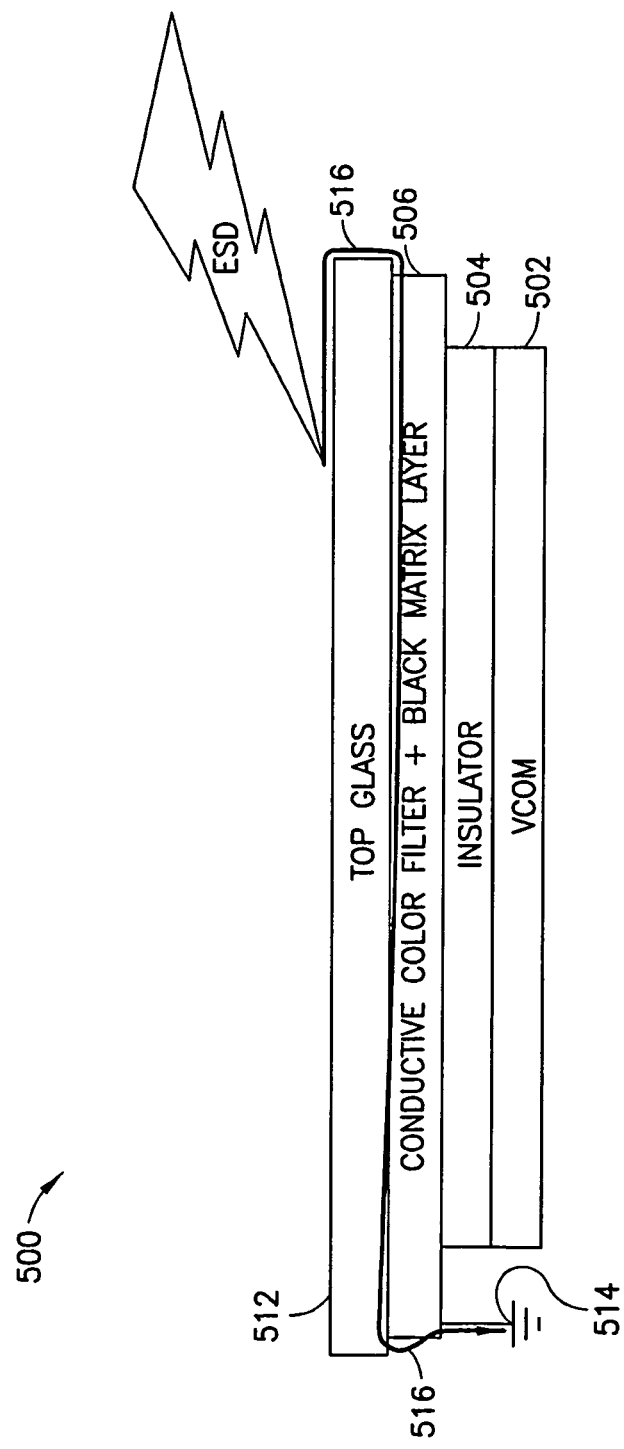
FIG. 12 is a partial side section view of a display panel section incorporating features of the invention.

According to some other embodiments the invention (and referring now also to FIG. 12), conductive color filters and black matrix can be used for electrostatic discharge (ESD) protection when conductive color filters+black matrix are connected to ground. For example, in FIG. 12, there is shown a side view of a display panel section 500. The display panel section 500 comprises a common voltage (VCOM) layer 502, an insulator layer 504, a conductive color filter and black matrix layer 506, and a top glass layer 512. As illustrated in FIG. 12, the conductive color filters and black matrix are connected to ground 514. This configuration allows for an additional ITO layer to be avoided. This generally provides for significant advantages when compared to conventional configurations where, for example, in IPS (In-Plane Switching technology) panels there is generally an ITO layer on top to act as an ESD protection layer, wherein this ITO layer is generally connected to ground on a flexible printed circuit (FPC) via a Ag (silver) dot. This additional ITO layer generally decreases the transparency of the display. Whereas in the embodiment shown in FIG. 12, an ESD current flow 516 is provided between the top glass 516 and the conductive color filter and black matrix layer 506 to provide for ESD protection while avoiding an additional ITO layer.

According to various exemplary embodiments of the invention, conductive and non-conductive color filters and black matrix materials are implemented in a display when they can be used for different purposes.

According to one example of the invention, touch screen layers are provided. Conductive and non-conductive materials are used for color filters and black matrix to create a touch pattern. A bottom guard layer is the same as a common voltage layer (VCOM) of the Liquid Crystal Display panel (LCD) that is under the color filter and black matrix layer and above a Liquid Crystal (LC) layer. A top guard layer may be a top polarizer what is on the top glass of the LCD.

According to another example of the invention, noise cancellation between a touch panel and a display panel is provided. Conductive materials are used for color filters and black matrix when they are creating a conductive layer. The conductive layer is connected to, for example, ground when it is creating a shield between a touch panel and a display panel against display noises that may cause problems with the touch panel.

According to another example of the invention, additional traces for connections are provided. Conductive and non-conductive materials are used for color filters and black matrix when traces, that are across an active area of the display panel, can be used as an electrical connection between electrical components that are assembled on a non-active area of the display. Conductive materials, that are used for color filters and black matrix, are used for pads of the electrical components (Non-active area).

According to another example of the invention, Electrostatic Discharge (ESD) protection is provided. Conductive materials are used filters and black matrix when they are creating a inductive layer. The conductive layer is connected to, for example, ground when it is creating an ESD shield.

Technical effects of any one or more of the exemplary embodiments provide a display having significant advantages when compared to conventional configurations, such as configurations having a separate multilayer sensor structure which significantly increases the thickness of the touch screen and thus the thickness on the product level. For example, conventional touch screen configurations generally include a guarding electrode layer (which may be connected to an excitation signal, for example), sensing electrodes (which may be connected to an analog front end IC [AFE], for example), and an excitation electrode (which may be connected to the excitation signal, for example), all separated by insulator layers. Thus, conventional configurations having separate multilayer sensor structure also decreases the optical performance of the touch screen, especially on the areas of sensor visibility and total reflection, particularly in laminated integrations. Additionally, in conventional configurations edges of the sensor may cross visible pixels when it can be visible.

Without in any way limiting the scope, interpretation, or application of the claims appearing below, a technical effect of one or more of the example embodiments disclosed herein is to provide conductive and non-conductive color filters and black matrix materials in a display to be used for touch screen layers, noise cancellation between a touch panel and a display panel, additional traces for connections, and Electrostatic Discharge (ESD) protection. Another technical effect of one or more of the example embodiments disclosed herein is to provide conductive color filters and black matrix to create a conductive layer, that can be used for shielding purposes (such as, noise, ESD, for example), when an additional shield layer(s) is not needed. Another technical effect of one or more of the example embodiments disclosed herein is to provide conductive and non-conductive color filters and black matrix to be used to create touch patterns or/and traces of the external component when an additional touch pattern or trace layer is not needed. Another technical effect of one or more of the example embodiments disclosed herein is to provide conductive and non-conductive materials to be used for color filters and black matrix to create: a touch pattern and/or traces layer, a conductive layer without an additional layer what is added above the display panel.

It should be understood that components of the invention can be operationally coupled or connected and that any number or combination of intervening elements can exist (including no intervening elements). The connections can be direct or indirect and additionally there can merely be a functional relationship between components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Below are provided further descriptions of various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (for example, any combination that is suitable, practicable and/or feasible) and are not limited only to those combinations described herein and/or included in the appended claims.

In one exemplary embodiment, an apparatus, comprising a display section; and a touch panel section adjacent the display section, wherein the touch pan section comprises a first layer, a second layer and a third layer, wherein the first layer comprises a conductive material, wherein the second layer comprises a bottom guard layer, wherein the third layer comprises a top guard layer, wherein the first layer is between the second and third layers, and wherein the conductive material comprises a color filter and a black matrix.

An apparatus as above, wherein the apparatus further comprises non-conductive material, wherein the conductive material and the non-conductive material are used for the color filters the black matrix to form a touch pattern.

An apparatus as above, wherein the display section further comprises a liquid crystal display panel, wherein the touch panel section further comprises a bottom guard layer, and wherein the bottom guard layer forms a common voltage layer for the liquid crystal display panel.

An apparatus as above, wherein a top guard layer of the touch panel section forms top polarizer for the display section.

An apparatus as above, wherein the display section and the touch panel section form an integrated display and touch panel.

An apparatus as above, wherein the apparatus comprises a mobile phone.

In another exemplary embodiment, a method, comprising forming a black matrix on a substrate; coating a surface of the substrate with a color resist film; exposing the color resist film; curing a pattern of the color resist film; and forming a transparent conductive film over the pattern of the color resist film.

A method as above, further comprising adding an insulator layer before the forming of the transparent conductive film.

A method as above, wherein the forming of the transparent conductive film further comprises forming an ITO film by a spattering method.

A method as above, wherein the exposing of the color resist film further comprises exposing the color resist film through a photomask.

A method as above, further comprising forming touch pads and touch pad traces on the substrate before the forming of the black matrix on the substrate.

A method as above, wherein the coating of the surface of the substrate comprises coating an entire surface of the substrate with the color resist film.

A method as above, wherein the substrate comprises a glass substrate.

A method as above, wherein the transparent conductive film forms a 3D touch panel bottom guard.

A method as above, wherein the coating of the surface of the substrate, the exposing of the color resist film, and the curing of the pattern is repeated three times for red, green, blue.

In another exemplary embodiment, an apparatus, comprising a color filter and a black matrix, wherein the color timer and the black matrix form a conductive layer, and wherein the conductive layer is configured to form a touch pattern layer, a traces layer, or a shielding layer.

An apparatus as above, wherein the conductive layer is connected to a ground when the conductive layer forms a shield between a touch panel and a display panel, and wherein the shield is configured to provide for noise cancellation between the touch panel and the display panel.

An apparatus as above, wherein the apparatus further comprises a non-conductive material, wherein the conductive layer comprises conductive material, wherein when the conductive and non-conductive materials are configured to provide traces proximate an active area of a display panel.

An apparatus as above, wherein conductive materials of the conductive layer are configured to provide pads of electrical components.

An apparatus as above, wherein the conductive layer is connected to ground, and wherein the conductive layer is configured to form an electrostatic discharge shield.

If desired, the different functions discussed herein may be performed in a different order and/or concurrently with each other. Furthermore, if desired, one or more of the above-described functions may be optional or may be combined.

Although various aspects the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus, comprising:
a display section; and
a touch sensor section adjacent the display section, wherein the touch sensor section comprises a first layer, a second layer and a third layer, wherein the first layer comprises a first conductive material, wherein the second layer comprises a bottom guard layer, wherein the third layer comprises a top guard layer, wherein the top guard layer comprises a second conductive material, wherein the first layer is between the second and third layers, wherein the first layer further comprises a substrate, wherein touch pad traces are implemented on the substrate, wherein the bottom guard layer is at a first side of the substrate, and wherein the top guard layer is at a second opposite side of the substrate, wherein the first conductive material comprises a color filter and a black matrix, wherein the color filter and the black matrix form a conductive layer, wherein the conductive layer is configured to form a touch pattern layer, wherein the bottom guard layer forms a common voltage layer for a liquid crystal display panel, and wherein the conductive layer is directly adjacent the common voltage layer.

2. The apparatus of claim 1 wherein the apparatus further comprises non-conductive material, wherein the first conductive material and the non-conductive material are used for the color filters and the black matrix to form a touch pattern.

3. The apparatus of claim 1 wherein the display section further comprises a liquid crystal display panel, wherein the bottom guard layer forms a common voltage layer for the liquid crystal display panel.

4. The apparatus of claim 1 wherein the top guard layer of the touch sensor section forms top polarizer for the display section.

5. The apparatus of claim 1 wherein the display section and the touch sensor section form en integrated display and touch panel.

6. The apparatus of claim 1 wherein the apparatus comprises a mobile phone.

7. The apparatus of claim 1 wherein the touch sensor section comprises a plurality of touch sensors, wherein the top guard layer does not cover the touch sensors.

8. The apparatus of claim 1 wherein the color filter comprises the substrate, and wherein the bottom guard layer is between a liquid crystal layer and the substrate.

9. The apparatus of claim 1 wherein a portion of the first layer and the second layer are on the same side of the substrate.

10. The apparatus of claim 1 wherein touch sensor pad areas are configured not to be shielded by the top guard layer.

11. An apparatus, comprising a top guard layer, a color filter and a black matrix, wherein the color filter and the black matrix form a conductive layer, wherein the conductive layer is configured to form a touch pattern layer, wherein the color filter comprises a substrate, wherein touch pad traces are implemented on the substrate, wherein the bottom guard layer is at a first side of the substrate, and wherein the top guard layer is at a second opposite side of the substrate, wherein the top guard layer is proximate the first conductive layer, wherein the top guard layer comprises a conductive material, wherein the bottom guard layer forms a common voltage layer for a liquid crystal display panel, and wherein the conductive layer is directly adjacent the common voltage layer.

12. The apparatus of claim 11 wherein the conductive layer is connected to a ground when the conductive layer forms a shield between a touch panel and a display panel, and wherein the shield is configured to provide for noise cancellation between the touch panel and the display panel.

13. The apparatus of claim 11 wherein the apparatus further comprises a non-conductive material, wherein the conductive layer comprises conductive material, wherein when the conductive and non-conductive materials are configured to provide traces proximate an active area of a display panel.

14. The apparatus of claim 11 wherein conductive materials of the conductive layer are configured to provide pads of electrical components.

15. The apparatus of claim 11 wherein the conductive layer is connected to ground, and wherein the conductive layer is configured to form an electrostatic discharge shield.

* * * * *